United States Patent
Okamoto

(10) Patent No.: US 7,642,210 B2
(45) Date of Patent: Jan. 5, 2010

(54) ZIRCONIA POROUS BODY AND MANUFACTURING METHOD THEREOF

(75) Inventor: Hiroshi Okamoto, Osaka (JP)

(73) Assignee: Daiichi Kigenso Kagaku Kogyo Co., Ltd., Osaka-shi, Osaka-fu (JP)

( * ) Notice: Subject to any disclaimer, the term of this patent is extended or adjusted under 35 U.S.C. 154(b) by 315 days.

(21) Appl. No.: 11/188,495

(22) Filed: Jul. 25, 2005

(65) Prior Publication Data

US 2006/0018822 A1  Jan. 26, 2006

(30) Foreign Application Priority Data

Jul. 26, 2004  (JP)  ............................. 2004-217757

(51) Int. Cl.
*C01G 23/00* (2006.01)
*C01G 25/00* (2006.01)
*C01G 27/00* (2006.01)
*C01G 23/02* (2006.01)
*C01G 25/04* (2006.01)
*C01G 25/06* (2006.01)
*C01G 27/02* (2006.01)
*C22B 34/10* (2006.01)
*C04B 35/48* (2006.01)
*C04B 35/49* (2006.01)
*B01J 21/00* (2006.01)
*B01J 23/02* (2006.01)
*B01J 23/06* (2006.01)

(52) U.S. Cl. ..................... 501/103; 423/69; 423/82; 423/84; 423/608; 501/102; 501/104; 501/105; 502/242; 502/340

(58) Field of Classification Search ................ 501/103; 423/608
See application file for complete search history.

(56) References Cited

U.S. PATENT DOCUMENTS 4,272,409 A * 6/1981 Bergna .......................... 502/8

(Continued)

FOREIGN PATENT DOCUMENTS

EP       1293479 A1    11/2000

(Continued)

OTHER PUBLICATIONS

Chuah et al. "The Preparation of High-Surface-Area Zirconia II. Influence of Precipitating Agent and Digestion on the Morphology and Microstructure of Hydrous Zirconia." *Journal of Calalysis*; 175:80-92 (1998).

(Continued)

*Primary Examiner*—Jerry Lorengo
*Assistant Examiner*—Jennifer A Smith
(74) *Attorney, Agent, or Firm*—Knobbe, Martens, Olson & Bear, LLP

(57) ABSTRACT

A zirconia porous body with excellent stability of heat resistance is manufactured. This relates to a zirconia porous body having peaks at pore diameters of 8 to 20 nm and 30 to 100 nm in a pore distribution based on the BJH method, with a total pore volume of 0.4 cc/g or more, and to a zirconia porous body having a peak at a pore diameters of 20 to 110 nm in a pore distribution based on the BJH method, with a total pore volume of 0.4 cc/g or more.

8 Claims, 1 Drawing Sheet

U.S. PATENT DOCUMENTS

| | | | |
|---|---|---|---|
| 5,004,719 | A | 4/1991 | Deller et al. |
| 5,399,535 | A | 3/1995 | Whitman |
| 5,478,543 | A | 12/1995 | Murota et al. |
| 5,532,198 | A | 7/1996 | Chopin et al. |
| 5,712,218 | A | 1/1998 | Chopin et al. |
| 5,840,271 | A | 11/1998 | Carrazza et al. |
| 5,908,800 | A | 6/1999 | Bonneau et al. |
| 6,214,306 | B1 | 4/2001 | Aubert et al. |
| 6,228,799 | B1 | 5/2001 | Aubert et al. |
| 6,511,642 | B1 | 1/2003 | Hatanaka et al. |
| 6,576,207 | B1 | 6/2003 | Mussmann et al. |
| 6,685,898 | B2 * | 2/2004 | Allen et al. ............... 423/213.2 |
| 2006/0018822 | A1 * | 1/2006 | Okamoto .................... 423/608 |

FOREIGN PATENT DOCUMENTS

| | | | |
|---|---|---|---|
| EP | 1 479 651 A | | 11/2004 |
| GB | 627 493 | | 8/1949 |
| GB | 2 256 860 A | | 12/1992 |
| JP | 8066631 A | | 3/1996 |
| JP | 10137597 A | | 5/1998 |
| JP | 2006036576 A | * | 2/2006 |
| WO | WO 99/41009 | | 8/1999 |
| WO | WO 03/037506 A | | 5/2003 |

OTHER PUBLICATIONS

Stöcker et al. "Zirconia Aerogels: Effect of the Use of Mono- and Dicarboxylic Acids in the Sol-Gel Process on Structural Properties." *Journal of Sol-Gel Science and Technology*; 10:269-282 (1997).

Zhang, et al. "Simultaneous Introduction of Chemical and Spatial Effects via a New Bimodal Catalyst Support Preparation Method," *Chem. Commun.* pp. 1216-1217, 2002.

* cited by examiner

ZIRCONIA POROUS BODY AND MANUFACTURING METHOD THEREOF

FIELD OF THE INVENTION

The present invention relates to a novel zirconia porous body and to a manufacturing method thereof.

DESCRIPTION OF THE RELATED ART

Conventionally, the specific surface area at 400° C. of zirconia bodies used as catalyst carriers has been at most about 100 m$^2$/g. Moreover, those with greater specific surface areas are generally amorphous, without a specific structure. Consequently, stable performance at high temperatures cannot be obtained with a simple zirconia body used as a catalyst carrier because the specific surface area is reduced at high temperatures of 400° C. or more. As a result, further improvements in heat resistance (thermal stability) need to be made for purposes of use as a catalyst carrier.

In contrast, in general zirconia-ceria compositions consisting of zirconium oxide and cerium oxide are more useful in terms of thermal stability than zirconia as catalysts capable of maintaining a relatively large specific surface area even at a high temperature of 1000° C.

In Japanese Unexamined Patent Publication No. 2001-170500, it is disclosed that "porous bodies, each being characterized in that the center diameter of the pores is in the range of a mesopore region, the distribution of the pores is sharp, at least a portion of the pores communicates in three-dimensional reticular form, the communication paths are random and have three-dimensional reticular structure and fiber-like structure is not substantially included," "porous bodies wherein the aforementioned center diameter is in the range of 2 to 100 nm," "porous bodies wherein 70% or more of the meso-pore volume (volume of pores in the range of 2 to 100 nm) is within ±5 nm of the center diameter of the pores in the meso-pore region," and "zirconia porous bodies which are porous bodies wherein 40% or more of the mesopore volume (volume of pores in the range of 2 to 100 nm) is within ±5 nm of the center diameter of the pores in the mesopore region" are manufactured by "precipitating at least part of the aluminum component from an aqueous aluminum salt solution in the range of pH 3 to 4.5, maintaining an aqueous solution containing the precipitate for a fixed time in an atmosphere of saturated steam or approaching saturated steam to produce a precursor and then baking the precursor."

Moreover, Japanese Patent No. 3129097 discloses that "porous tetragonal zirconium oxide particles for liquid chromatography having a average particle size of 0.5 to 300 microns and a average pore diameter of 20 to 300 angstroms (2 to 30 nm) and containing 0.1 to 10% silica by weight" are manufactured by "first heating a zirconium oxide sol produced by adding a zirconium salt and a silicon compound to an alkaline aqueous solution for 8 or more hours at 80 to 150° C. in an alkaline aqueous solution, and then forming grains which are baked at 200 to 1000° C.," and how the aforementioned tetragonal zirconium oxide particles "have a pore volume of 0.17 to 0.42 ml/g."

In Japanese Patent No. 3016865, it is disclosed that "a mixed cerium or zirconium oxide having a total pore volume of at least 0.6 cm$^3$/g wherein at least 50% of the total pore capacity consists of pores having a diameter of 10 to 100 nm" is manufactured by "in a method for manufacturing a mixed cerium or zirconium oxide, preparing a liquid mixture containing a trivalent cerium or zirconium compound; bringing this mixture into contact with (i) a carbonate or bicarbonate and (ii) a base so that the pH of the reactive medium remains neutral or basic between the reactions; collecting a precipitate containing a cerium carbonate compound; and baking that precipitate," and how that oxide "has a specific surface area of at least 20 m$^2$/g after being baked for 6 hours at 800° C."

However, although the specific surface area and total pore volume are not described in Japanese Unexamined Patent Publication No. 2001-170500, it would seem from the fact that the central pore diameter of 9.5 nm when baked at 400° C. increases to 20.5 nm upon baking at 600° C. that thermal stability at high temperatures (about 1000° C.) is unsatisfactory.

In Japanese Patent No. 3129097, the pore volume of 0.17 to 0.42 ml/g is small. In this case it would be difficult to obtain adequate properties for various uses such as catalysts.

In Japanese Patent No. 3016865, the specific surface area upon baking for 6 hours at 900° C. is at most 35 m$^2$/g, so further improvement is necessary from the standpoint of thermal stability.

SUMMARY OF THE INVENTION

Consequently, it is a principle object of the present invention to provide a zirconia porous body with excellent thermal stability.

The inventors perfected the present invention when they discovered as a result of research in light of the problems of related art that the aforementioned object could be achieved by means of a porous body obtained by adoption of specific steps.

That is, the present invention relates to the following zirconia porous body and manufacturing method therefor.

1. A zirconia porous body having peaks at pore diameters of 8 to 20 nm and 30 to 100 nm in a pore distribution based on the BJH method, with a total pore capacity of 0.4 cc/g or more.

2. A zirconia porous body according to 1 above, wherein the total volume of pores having a diameter of 20 to 200 nm is 50% or more of the total pore volume.

3. A zirconia porous body having a peak at a pore diameters of 20 to 110 nm in a pore distribution based on the BJH method, wherein the total pore volume is 0.4 cc/g or more.

4. A zirconia porous body according to 3 above, wherein the total volume of pores having a diameter of 10 to 100 nm is 50% or more of the total pore volume.

5. A zirconia porous body according to any of 1 through 4 above, wherein the primary particle size is 5 to 30 nm.

6. A zirconia porous body according to any of 1 through 5 above, wherein the specific surface area after 3 hours of baking at 1000° C. is at least 30 m$^2$/g.

7. A method for manufacturing a zirconia porous body, which is a method for manufacturing a zirconia porous body having:

(1) a first step wherein basic zirconium sulfate-containing reaction liquid A, which is prepared by mixing a sulfating agent at a temperature of at least 80° C. but less than 95° C. with a zirconium salt solution at a temperature of at least 80° C. but less than 95° C., is mixed with basic zirconium sulfate-containing reaction liquid B, which is prepared by mixing a sulfating agent at a temperature of at least 65° C. but less than 80° C. with a zirconium salt solution at a temperature of at least 65° C. but less than 80° C., (2) a second step wherein the reaction liquid obtained in the first step is aged at a temperature of 95° C. or more, (3) a third step wherein zirconium hydroxide is produced by adding alkali to the mixture obtained in the second step to neutralize the aforementioned basic zirconium sulfate, and (4) a fourth step wherein the aforementioned zirconium hydroxide is heat treated to obtain a zirconia porous body.

8. A manufacturing method according to 7 above, wherein in the preparation of the aforementioned reaction liquid A and/or reaction liquid B the sulfating agent and zirconium salt solution are mixed so that the production speed with basic zirconium sulfate converted to zirconium oxide is 20 g/min/L or less.

9. A manufacturing method according to 8 above, wherein the proportion of the aforementioned reaction liquid A mixed with the aforementioned reaction liquid B is at least 0.1 but less than 1 as a liquid volume ratio of reaction liquid A/(reaction liquid A+reaction liquid B).

10. A method for manufacturing a zirconia porous body, which is a method for manufacturing a zirconia porous body having:

(1) a first step wherein a basic zirconium sulfate-containing reaction liquid A is prepared by mixing a sulfating agent at a temperature of at least 80° C. but less than 95° C. with a zirconium salt solution at a temperature of at least 80° C. but less than 95° C. so that the production speed with basic zirconium sulfate converted to zirconium oxide is 20 g/min/L or less, (2) a second step wherein the reaction liquid obtained in the first step is aged at 95° C. or more, (3) a third step wherein zirconium hydroxide is produced by adding alkali to the mixture obtained in the second step to neutralize the aforementioned basic zirconium sulfate, and (4) a fourth step wherein the aforementioned zirconium hydroxide is heat treated to obtain a zirconia porous body.

11. A manufacturing method according to any of 7 through 10 above, wherein the free acid concentration of the aforementioned reaction liquid A is 0.1 to 2.0 N.

12. A manufacturing method according to any of 7 through 9 above, wherein the free acid concentration of the aforementioned reaction liquid B is 0.1 to 2.0 N.

13. A manufacturing method according to any of 7 through 12 above, comprising a step of adding a compound of at least one of the rare earth elements, transitional metal elements, Ca, Mg, Al, Si and Zn during at least one of the first through fourth steps.

14. A manufacturing method according to any of 7 through 12 above, comprising a step of adding a salt of at least one of the rare earth elements, transitional metal elements, Ca, Mg, Al, Si and Zn to the basic zirconium sulfate.

15. A manufacturing method according to any of 7 through 12 above, comprising a step of adding an oxide and/or hydroxide of at least one of the rare earth elements, transitional metal elements, Ca, Mg, Al, Si and Zn to the zirconium hydroxide.

ADVANTAGES OF THE INVENTION

In a known method, basic zirconium sulfate was produced by "mixing a sulfating agent at room temperature and a zirconium salt solution at room temperature, raising the temperature to between 65° C. and less than 80° C. and maintaining it for a fixed time (aging)" to produce basic zirconium sulfate which was then neutralized with alkali and the resulting hydroxide baked to manufacture a zirconia porous body.

However, the main properties of the zirconia porous body which is the final product are a) mainly determined at the stage of producing the basic zirconium sulfate and b) difficult to control in the case of well-known co-precipitation with alkali. Consequently, as shown in FIG. 1 under "Conventional Method," in terms of the relationship between pore diameter and pore volume exhibits a sharp distribution with a peak at about 7 to 10 nm, while the total pore volume is about 0.2 to 0.4 cc/g. This makes it liable to sintering when baked at high temperatures, so that for example while the specific surface area is 80 to 150 m$^2$/g upon baking at 400° C. it falls to less than 30 m$^2$/g upon baking at 1000° C. This does not necessarily fulfill the demands for thermal stability of a catalyst material to be used for waste gas treatment in internal combustion engines.

In contrast, the zirconia porous body of the present invention can provide excellent effects in terms of thermal stability because it has a specific pore structure. That is, even when it is heated at high temperatures the decrease in specific surface area can be effectively controlled. As a result, it can retain a higher specific surface area than conventional products.

The zirconia porous body having characteristics according to the present invention is useful as a catalyst carrier. It can be preferably used as a catalyst material to be used for waste gas treatment in internal combustion engines.

DESCRIPTION OF THE PREFERRED EMBODIMENTS

1. Zirconia Porous Body

Figure 1:
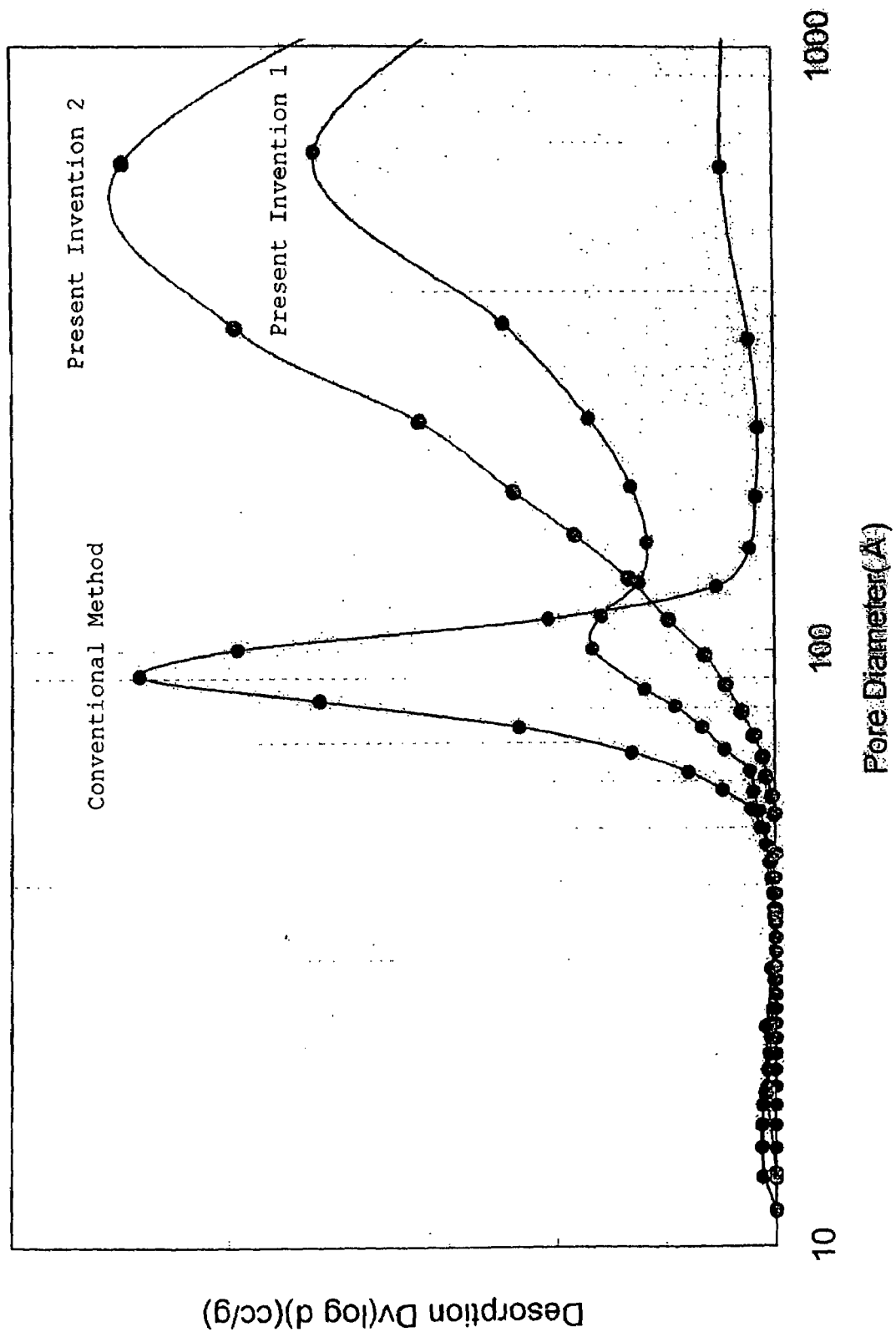
FIG. 1 is a graph showing the pore distributions of porous bodies obtained in Example 1 and Example 2 and by a conventional method.

The zirconia porous body of the present invention features a specific pore structure. More specifically, it features the following first porous body and second porous body (both of which are generally called "the porous body of the present invention").

The first porous body has peaks at pore diameters of 8 to 20 nm and 30 to 100 nm in a pore distribution based on the BJH method, with a total pore volume of 0.4 cc/g or more. The aforementioned pore distribution is measured by the equipment and methods shown in Example 1 below, and is expressed with "pore volume" on the vertical axis and "pore diameter" on the horizontal axis as shown in FIG. 1. Superior thermal stability can be achieved by adopting this pore structure. From this standpoint, it is particularly desirable that the aforementioned peaks appear at 10 to 18 nm and 40 to 70 nm.

Moreover, although the aforementioned total pore volume is usually 0.4 cc/g or more, it is particularly desirable that it be 0.5 cc/g or more. The upper limit of total pore volume is not specified but is normally about 0.7 to 0.9 cc/g.

It is desirable in the first porous body that the total volume of pores having a diameter of 20 to 200 nm (particularly 30 to 180 mm) be 50% or more of the total pore volume.

The second porous body has a peak at a pore diameter of 20 to 110 nm in a pore distribution obtained by the BJH method, with a total pore volume of 0.4 cc/g or more. Superior thermal stability can be obtained by adopting this pore structure. From this standpoint, it is particularly desirable that the aforementioned peak be at 25 to 90 nm or preferably 30 to 70 nm.

Moreover, although the aforementioned total pore volume is normally 0.4 cc/g or more, it is particularly desirable that it be 0.5 cc/g or more. The upper limit of total pore volume is not specified but is normally about 0.7 to 0.9 cc/g.

It is desirable in the second porous body that the total volume of pores having a diameter of 10 to 100 nm (particularly 25 to 90 mm) be 50% or more of the total pore volume.

The porous body of the present invention has a structure in which the primary particles normally connect three-dimensionally. The primary particle size (averege particle size) as calculated by X-ray analysis is not particularly limited in this case but is normally 5 to 30 nm. Better thermal stability can be obtained because the porous body is composed of primary particles having this particle size.

In the porous body of the present invention the specific surface area (BET method) after 3 hours of baking at 1000° C. is preferably 30 m²/g or more while the specific surface area after 3 hours baking at 1050° C. is preferably 25 m²/g or more. The porous body of the present invention is thermally very stable, with the decrease in specific surface area effectively controlled even with a heat history. As a result, it can maintain a higher specific surface area than conventional products under high temperature conditions. The aforementioned specific surface area means a specific surface area of a zirconia porous body obtained by baking a porous body at 1000° C. for 3 hours. The porous body is obtained by heating zirconium hydroxide at 400° C. as in Example 1 below for example.

The porous body of the present invention is substantially composed of zirconium oxide ($ZrO_2$), but when a third component have been added as described below the component may also be included. When the third component is included it becomes a solid solution or mixed oxide comprising these. There are no particular limits on the percentage content of the third component(s), which can normally be less than 50% by weight or particularly 1 to 49% by weight of the porous body of the present invention. Unavoidable impurities may also be contained to the extent that they do not interfere with the profitable effects of the present invention.

2. Method for Manufacturing Zirconia Porous Body

There are no limits on the method for manufacturing the porous body of the present invention as long as a porous body is obtained having a structure as described above, but in particular it can be favorably manufactured by the manufacturing method of the present invention. That is, it is preferably manufactured by the first method and second method shown below.

The manufacturing method for a zirconia porous body of the first method comprises:

(1) a first step of mixing basic zirconium sulfate-containing reaction liquid A, which is prepared by mixing a sulfating agent at a temperature of at least 80° C. but less than 95° C. with a zirconium salt solution at a temperature of at least 80° C. but less than 95° C., with basic zirconium sulfate-containing reaction liquid B, which is prepared by mixing a sulfating agent at a temperature of at least 65° C. but less than 80° C. with a zirconium salt solution at a temperature of at least 65° C. but less than 80° C., (2) a second step of aging the reaction liquid obtained in the first step at a temperature of 95° C. or more, (3) a third step of producing zirconium hydroxide by adding alkali to the mixture obtained in the second step to neutralize the basic zirconium sulfate, and (4) a fourth step of heat-treating the zirconium hydroxide to obtain a zirconia porous body.

The manufacturing method of a zirconia porous body of the second method comprises:

(1) a first step of preparing a basic zirconium sulfate-containing reaction liquid A by mixing a sulfating agent at a temperature of at least 80° C. but less than 95° C. with a zirconium salt solution at a temperature of at least 80° C. but less than 95° C. so that the production speed with basic zirconium sulfate converted to zirconium oxide is 20 g/min/L or less, (2) a second step of aging the reaction liquid obtained in the first step at 95° C. or more, (3) a third step of producing zirconium hydroxide by adding alkali to the mixture obtained in the second step to neutralize the basic zirconium sulfate, and (4) a fourth step of heat-treating the zirconium hydroxide to obtain a zirconia porous body.

The various steps for the first method and second method are explained below. Since the second through fourth steps are the same for both methods, they are explained together.

First Step (First Method)

In the first step of the first method, basic zirconium sulfate-containing reaction liquid A, which is prepared by mixing a sulfating agent at a temperature of at least 80° C. but less than 95° C. with a zirconium salt solution at a temperature of at least 80° C. but less than 95° C., is mixed with basic zirconium sulfate-containing reaction liquid B, which is prepared by mixing a sulfating agent at a temperature of at least 65° C. but less than 80° C. with a zirconium salt solution at a temperature of at least 65° C. but less than 80° C.

The sulfating agent used in reaction liquids A and B may be any which reacts with zirconium ions to produce a sulfate (that is, to sulfate) and examples include sodium sulfate, ammonium sulfate and the like. The sulfating agent may be in any form such as a powder, solution or the like. Of these, a solution (particularly an aqueous solution) is used by preference. When using it as a solution, the concentration can be set as appropriate.

A solution obtained by dissolving a zirconium salt in a solvent can be used as the zirconium salt solution used in reaction liquids A and B. The zirconium salt is not limited as long as it is one which supplies zirconium ions, and for example one or two or more of zirconium oxynitrate, zirconium oxychloride, zirconium nitrate and the like can be used. Of these, zirconium oxychloride is used by preference from the standpoint of superior productivity on an industrial scale. The aforementioned solvent may be selected appropriately according to the type of zirconium salt used and the like, but normally water is used by preference.

There are no particular limits on the concentration of the zirconium salt solution, which should normally be 5 to 200 g or particularly 50 to 100 g of zirconium oxide ($ZrO_2$) per 1000 g of solvent.

A basic zirconium sulfate-containing reaction liquid is prepared by mixing the sulfating agent with the zirconium salt solution. In this case, a sulfating agent and zirconium salt solution at a temperature of at least 80° C. but less than 95° C. are mixed in the case of reaction liquid A. In the case of reaction liquid B, a sulfating agent and zirconium salt solution are mixed at a temperature of at least 65° C. but less than 80° C. That is, the sulfating agent and zirconium salt solution are heated ahead of time to the aforementioned temperature, and the sulfating agent and zirconium salt solution are mixed while maintaining that temperature. In this way, by using a reaction liquid which is mixed at the aforementioned temperature, it is possible to control the properties (for example, pore diameter peak locations, total pore volume, heat resistance of specific surface area, cohesion of primary particles and the like) of the zirconia porous body which is the final product to the desired values.

Mixing of the sulfating agent and zirconium salt solution can be accomplished so that a basic zirconium sulfate is produced by the reaction of the two. The sulfating agent and zirconium salt are reacted at a temperature of 65° C. or more to produce a basic zirconium sulfate.

In preparing reaction liquid A and/or reaction liquid B (particularly reaction liquid A), the sulfating agent and zirconium salt solution can be mixed so that the production speed with basic zirconium sulfate converted to zirconium oxide is 20 g/min/L or less (particularly 15 g/min/L or less or preferably 10 g/min/L or less). In this way, the aforementioned properties of the resulting zirconia porous body can be controlled. It is particularly effective that the proportion of the reaction liquid A mixed with said reaction liquid B be at least 0.1 but less than 1 (preferably 0.1 to 0.9, more preferably 0.2 to 0.8) as a liquid volume ratio of reaction liquid A/(reaction liquid A+reaction liquid B). There are no limits on the methods of controlling the reaction speed within the aforementioned range, and for example a method of dripping one reaction liquid into the other reaction liquid at a specific speed or the like can be employed.

In the present invention, "with basic zirconium sulfate converted to zirconium oxide" signifies that basic zirconium sulfate is expressed by the general formula $\{ZrO\,(OH)_2\}_x \cdot (ZrOSO_4)_{1-x}$ ($0<x<1$), converted to zirconium oxide in anticipation of the zirconium in the basic zirconium sulfate becoming zirconium oxide as the final product, since molecular weight cannot be determined unequivocally.

The production speed in the present invention is the speed with 16% zirconium oxychloride added to a 25% sodium sulfate solution.

Moreover, the aforementioned "production speed" in the present invention is the production speed per 1 L liquid volume after completion of mixing. That is, the production speed signifies the value obtained by dividing the total production volume by the time (in minutes) from initiation till completion of mixing, and dividing the result by the liquid volume (L) after completion of mixing.

Moreover, in the present invention reaction liquid A and/or reaction liquid B can be used as two or more reaction liquids with different temperatures within the aforementioned temperature range. For example, when reaction liquid A consists of two liquids, a reaction liquid A-1 obtained by mixing a sulfating agent at a temperature of at least 80° C. but less than 85° C. with a zirconium salt solution at a temperature of at least 80° C. but less than 85° C. and a reaction liquid A-2 obtained by mixing a sulfating agent at a temperature of at least 85° C. but less than 95° C. with a zirconium salt solution at a temperature of at least 85° C. but less than 95° C. can be used as reaction liquid A. Moreover, for example when reaction liquid B consists of two liquids, a reaction liquid B-1 obtained by mixing a sulfating agent at a temperature of at least 65° C. but less than 70° C. with a zirconium salt solution at a temperature of at least 65° C. but less than 70° C. and a reaction liquid B-2 obtained by mixing a sulfating agent at a temperature of at least 70° C. but less than 80° C. with a zirconium salt solution at a temperature of at least 70° C. but less than 80° C. can be used as reaction liquid B. By thus using liquids at different temperatures it is possible to more precisely control the pore structure of the zirconia porous body.

In the present invention, the free acid concentration of reaction liquid A and/or B is preferably 0.1 to 2.0 N. Setting the free acid concentration within the aforementioned range allows the agglomerate which makes up the porous body of the present invention to be more accurately controlled. The free acid concentration can be adjusted using hydrochloric acid, sulfuric acid or the like for example. In the present invention it is particularly desirable to use hydrochloric acid.

Next, reaction liquid A is mixed with reaction liquid B. There are no particular limits on the mixing method, mixing order and the like. The mixed proportions of the two can be determined appropriately according to the use, desired properties and the like of the porous body within the range of generally reaction liquid A: reaction liquid B=1:0.1–9 in zirconium oxide conversion.

First Step (Second Method)

In the first step of the second method, basic zirconium sulfate-containing reaction liquid A is prepared by mixing a sulfating agent at a temperature of at least 80° C. but less than 95° C. with a zirconium salt solution at a temperature of at least 80° C. but less than 95° C. so that the production speed with basic zirconium sulfate converted to zirconium oxide is 20 g/min/L or less.

The sulfating agent and zirconium salt solution can be the same as those used in the first step of the first method above.

In mixing the sulfating agent and zirconium salt solution the production speed with basic zirconium sulfate converted to zirconium oxide is normally 20 g/min/L or less, but 15 g/min/L or less is preferable and 10 g/min/L or less is more preferable.

Second Step (First and Second Methods)

In the second step, the reaction liquid obtained in the first step is aged at 95° C. or more (without being cooled first). Through the second step it is possible to ensure a high yield by means of complete production of basic zirconium sulfate. The upper limit of the aging temperature can be set so that the reaction liquid does not boil. The aging time can be set appropriately according to the aforementioned temperature and the like, but is normally 0.5 hours or more or especially 1 hour or more.

Third Step (First and Second Methods)

In the third step, alkali is added to the reaction liquid obtained in the second step to neutralize the aforementioned basic zirconium sulfate, producing zirconium hydroxide.

There are no particular limits on the alkali, and for example ammonium hydroxide, ammonium bicarbonate, sodium hydroxide, potassium hydroxide and the like can be used. The amount of alkali added can be any capable of producing a precipitate from the aforementioned reaction liquid, and the pH of the reaction liquid should normally be 9 or more or preferably 10 or more. The alkali can be added in its original form or in the form of a solution obtained by dissolving it in an appropriate solvent (such as water).

The resulting precipitate may be collected by a known solid-liquid separation method such as filtration, centrifugation, decantation or the like. After collection, it can be water washed as necessary. A drying process can also be applied as necessary. The drying process can be either natural drying, heat drying or the like. Moreover, a pulverization process, classification process or the like can also be applied after drying.

Fourth Step (First and Second Methods)

In the fourth step, the zirconium hydroxide is heat-treated to obtain a zirconia porous body.

The heat treatment temperature can normally be in the range of 400 to 1100° C. The heat treatment time can be set appropriately according to the heat treatment temperature and the like, but normally about 1 to 5 hours is desirable. There are no particular limits on the heat treatment atmosphere, but atmospheric air (ambient air) or an oxidizing atmosphere is used.

In the manufacturing method of the present invention, a compound (generally called a "third component") of at least one of the rare earth elements, transitional metal elements, Ca, Mg, Al, Si and Zn (preferably a rare earth element) can be added during at least one of the first through fourth steps. In this way it is possible to impart the desired material properties to the resulting zirconia porous body.

Examples of rare earth elements include Sc, Y, La, Ce, Pr, Nd and other lanthanoid elements for example. Examples of transitional metal elements include Ti, Cr, Mn, Fe, Co, Ni, Cu, Mo, W and the like. The third component compound can be in any form such as a metal salt (nitrate, sulfate, chloride, carbonate or other inorganic acid salt or oxalate, acetate or other organic acid salt) or a hydroxide, oxide or the like. These can be determined appropriately according to the stage of addition and the like. For example, when addition is to the basic zirconium sulfate it is desirable to add at least one salt of a rare earth element, transitional metal element, Ca, Mg, Al, Si or Zn. When addition is to the zirconium hydroxide, it is desirable to add at least one oxide and/or hydroxide of a rare earth element, transitional metal salt, Ca, Mg, Al, Si and Zn. When using an oxide and/or hydroxide, it is desirable to apply a pre-treatment such as baking at 1100° C. or more for example so as not to adversely affect the properties of the target zirconia porous body.

The third component can be added in its original form, but is preferably added in the form of an ion of the third component in particular. The ion concentration in this case can be set appropriately according to the type of third component and the like.

The amount of third component added can be set appropriately according to the type of element added, the desired material properties and the like, but normally less than 50% or specifically 1 to 49% by weight of the zirconia porous body is desirable. When a third component is used, the finally obtained zirconia porous body becomes a solid solution or composite oxide comprising this components.

EXAMPLES

The features of the present invention are explained in more detail below using examples. However, the scope of the present invention is not limited to the scope of these examples.

The material properties in the examples are measured by the following methods. Moreover, the materials obtained in the various examples and comparative examples each contain 1 to 2% by weight hafnium oxide as an unavoidable impurity.

(1) Specific Surface Area

Measured by the BET method using a surface area analyzer (Flowsorb II, Micromeritics).

(2) Pore Volume and Pore Diameter

Measured by the BJH method using the measurement device "Autosorb-1" (Quantachrome, Model No. AS1KR).

(3) Oxygen Storage Capacity (OSC)

Measured by the oxygen pulse method at 600° C. using the measurement device "Multitask TPD" (TPD-1-AT, BEL Japan).

(4) Primary Particle Size

Calculated using the following Scherrer equation from the half-value width of the X-ray analysis peak:

$$D = k\lambda/(\beta \cos\theta)$$

where k is the constant 0.9, $\lambda$ is the X-ray wavelength (Å), $\beta$ is the analytical line width of the sample minus the analytic line width (radian) of a standard sample, and $\theta$ is the analysis angle.

Example 1

1) 94 g of a 25% sodium sulfate solution was heated to 65° C., 250 g of a 16% (by $ZrO_2$ conversion) zirconium oxychloride solution which had been previously heated to 75° C. was added thereto, hydrochloric acid was added to achieve a free acid concentration of 1.5 N and this was maintained for 0.5 hours to produce basic zirconium sulfate (low-temperature reaction liquid).

2) 141 g of a 25% sodium sulfate solution was heated to 85° C., 375 g of a 16% (by $ZrO_2$ conversion) zirconium oxychloride solution which had been previously heated to 85° C. was added thereto, hydrochloric acid was added to achieve a free acid concentration of 1.5 N and this was maintained for 0.5 hours to produce basic zirconium sulfate (high-temperature reaction liquid).

3) The aforementioned low-temperature reaction liquid and high-temperature reaction liquid were mixed, heated to 95° C. and maintained for 0.5 hours to age them.

4) Next, the aged solution was cooled to room temperature and 125 g of a 20% ($CeO_2$ conversion) cerium sulfate solution was added to and mixed uniformly.

5) 25% sodium hydroxide was added to the resulting mixed solution, neutralizing it to a pH of 13 or more and producing a hydroxide precipitate.

6) The resulting hydroxide precipitate was filtered and thoroughly water washed.

7) After being water washed the hydroxide was dried for 24 hours at 105° C.

8) The dried hydroxide was baked for 5 hours at 400° C. in an atmospheric air to obtain a zirconium oxide-containing zirconium porous body.

9) The aforementioned porous body was further baked for 3 hours in an atmospheric air at 900 to 1100° C. to obtain a baked product.

10) The aforementioned baked product was subjected to X-ray analysis and the specific surface area, pore diameter, oxygen storage capacity (OSC) and the like were measured. The composition of the resulting baked product (weight %) is shown in Table 1, while its material property values are shown in Tables 2 and 3. The pore distribution of a baked product obtained by baking at 1000° C. in 9) above is shown in FIG. 1 ("Present Invention 1").

TABLE 1

| | Composition | | | | | | |
|---|---|---|---|---|---|---|---|
| | $ZrO_2$ | $CeO_2$ | $TiO_2$ | $Fe_2O_3$ | $Al_2O_3$ | $La_2O_3$ | $Nd_2O_3$ |
| Example 1 | 80 | 20 | | | | | |
| Example 2 | 80 | 20 | | | | | |
| Comparative Example 1 | 80 | 20 | | | | | |
| Example 3 | 70 | | 30 | | | | |
| Example 4 | 70 | | 30 | | | | |
| Comparative Example 2 | 70 | | 30 | | | | |
| Example 5 | 95 | | | 5 | | | |
| Example 6 | 95 | | | 5 | | | |
| Comp. Example 3 | 95 | | | 5 | | | |
| Example 7 | 99 | | | | 1 | | |
| Example 8 | 99 | | | | 1 | | |
| Comparative Example 4 | 99 | | | | 1 | | |
| Example 9 | 72 | 21 | | | | 1.7 | 5.3 |
| Example 10 | 72 | 21 | | | | 1.7 | 5.3 |
| Comp. Example 5 | 72 | 21 | | | | 1.7 | 5.3 |

TABLE 2

Material property values

| | Pore diameter peaks | | Total pore volume | Primary particle size |
|---|---|---|---|---|
| | Peak 1 (nm) | Peak 2 (nm) | (cc/g) | (nm) |
| Example 1 | 15 | 50 | 0.5 | 12 |
| Example 2 | — | 52 | 0.6 | 12 |
| Comparative Example 1 | 10 | — | 0.3 | 12 |
| Example 3 | 14 | 45 | 0.6 | 11 |
| Example 4 | — | 52 | 0.7 | 11 |
| Comparative Example 2 | 9 | — | 0.4 | 11 |
| Example 5 | 12 | 40 | 0.6 | 11 |
| Example 6 | — | 43 | 0.7 | 11 |
| Comparative Example 3 | 12 | — | 0.5 | 10 |
| Example 7 | 12 | 48 | 0.6 | 10 |
| Example 8 | — | 50 | 0.7 | 10 |
| Comparative Example 4 | 9 | — | 0.4 | 11 |
| Example 9 | 12 | 52 | 0.5 | 11 |
| Example 10 | — | 45 | 0.7 | 11 |
| Comparative Example 5 | 10 | — | 0.3 | 11 |

TABLE 3

Material property values

| | Specific surface area (m$^2$/g) | | | | | OSC |
|---|---|---|---|---|---|---|
| | 400° C. | 900° C. | 950° C. | 1000° C. | 1050° C. | 1100° C. | (μmol-O$_2$/g) |
| Example 1 | 120 | 55 | 50 | 30 | 25 | 15 | 140 |
| Example 2 | 120 | 55 | 50 | 35 | 25 | 15 | 140 |
| Comp. Ex. 1 | 100 | 40 | 35 | 20 | 12 | 8 | 120 |
| Example 9 | 130 | 65 | 65 | 48 | 43 | 20 | 190 |
| Example 10 | 130 | 65 | 65 | 55 | 48 | 22 | 185 |
| Comp. Ex. 5 | 125 | 40 | 37 | 25 | 15 | 8 | 160 |

A distribution clearly different from that of "Conventional Method" is shown in FIG. 1. That is, there are two pore diameter peaks, and the total pore volume is shown to be about 0.5 cc/g. This zirconia porous body has a primary particle size in the range of 5 to 30 nm, the specific surface area after 3 hours of baking at 1000° C. is at least 30 m$^2$/g, and the specific surface area after 3 hours of baking at 1050° C. is at least 25 M$^2$/g, indicating a zirconia porous body with an excellent thermal stability of specific surface area and a large total pore volume.

Example 2

1) 237 g of a 25% sodium sulfate solution was heated to 85° C. and 625 g of a 16% (by ZrO$_2$ conversion) zirconium oxychloride solution which had been previously heated to 85° C. was added thereto. The addition speed of the aforementioned zirconium oxychloride solution here was adjusted so that the production speed of basic zirconium sulfate as converted to zirconium oxide would be about 12 g/minute/L, or about ⅕ the normal speed. Next, hydrochloric acid was added to achieved a free acid concentration of 1.5 N, and this was maintained for 0.5 hours to produce basic zirconium sulfate.

2) The aforementioned reaction liquid was first heated to 95° C. and then maintained for 0.5 hours to age it.

3) Next, the aged solution was cooled to room temperature and 125 g of a 20% (CeO$_2$ conversion) cerium nitrate solution was added to and mixed uniformly.

4) 25% sodium hydroxide was added to the resulting mixed solution to adjust to pH to 13 or more and produce a hydroxide precipitate.

5) The resulting hydroxide precipitate was filtered and thoroughly water washed.

6) After being water washed the hydroxide was dried for 24 hours at 105° C.

7) The dried hydroxide was baked for 5 hours at 400° C. in an atmospheric air to obtain a zirconium oxide-containing zirconium porous body.

8) The aforementioned porous body was further baked for 3 hours in an atmospheric air at 900 to 1100° C. to obtain a baked product.

9) The aforementioned baked product was subjected to X-ray analysis and the specific surface area, pore diameter, oxygen storage capacity (OSC) and the like were measured. The composition of the resulting baked product (weight %) is shown in Table 1, while its material property values are shown in Tables 2 and 3. The pore distribution of a baked product obtained by baking at 1000° C. in 8) above is shown in FIG. 1 ("Present Invention 2").

The porous body of the "Conventional Method" in FIG. 1 has a sharp distribution of pore diameters, with the result that it is liable to sintering when baked at high temperatures, and the thermal stability of specific surface area was not necessarily satisfactory. That is, it seems that because in a zirconia porous body manufactured by the "conventional method" "fine particles are densely packed," there is a large area of contact between particles which makes it liable to sintering at high temperatures. In contrast, by reducing the production speed with basic zirconium sulfate converted to zirconium oxide to ⅓ or less (preferably ⅕ or less) that of the "conventional method" as in Example 2, a zirconia porous body is obtained with the pore diameter distribution and pore volume shown under "Present Invention 2" in FIG. 1 which has excellent thermal stability.

Comparative Example 1 (Coprecipitation)

1) 625 g of a 16% (ZrO$_2$ conversion) zirconium oxychloride solution at room temperature was added to 237 g of a 25% sodium sulfate solution. After addition of hydrochloric acid to achieve a free acid concentration of 1.5 N, this was heated to 75° C. and maintained for 1 hour to age while producing basic zirconium sulfate.

2) Next, the aged solution was cooled to room temperature and 125 g of a 20% (CeO$_2$ conversion) cerium sulfate solution was added to and mixed uniformly.

3) 25% sodium hydroxide was added to the resulting mixed solution, neutralizing it to a pH of 13 or more and producing a hydroxide precipitate.

4) The resulting hydroxide precipitate was filtered and thoroughly water washed.

5) After being water washed the hydroxide was dried for 24 hours at 105° C.

6) The dried hydroxide was baked for 5 hours at 400° C. in atmosphere to obtain a zirconium oxide-containing zirconium porous body.

7) The aforementioned porous body was further baked for 3 hours in an atmospheric air at 900 to 1100° C. to obtain a baked product.

8) The aforementioned baked product was subjected to X-ray analysis and the specific surface area, pore diameter, oxygen storage capacity(OSC) and the like were measured. The composition of the resulting baked product (weight %) is shown in Table 1, while its material property values are shown in Tables 2 and 3. The pore distribution of a baked product obtained by baking at 1000° C. in 7) above is shown in FIG. 1 ("Conventional Method").

Example 3

A baked product was manufactured as in Example 1 except that step 4) in Example 1 was replaced by the following. The aged solution was cooled to room temperature, and a 15% titanium tetrachloride solution was added so as to achieve a titanium oxide ($TiO_2$) content of 30% by weight of the final product (baked product), and mixed uniformly.

The material properties of the resulting baked product were measured as in Example 1. The results are shown in Table 1. The composition (% by weight) of the resulting baked product is shown in Table 1, and the material property values in Tables 2 and 3. The pore distribution of a product baked at 1000° C. was measured with roughly the same results as those shown under "Present Invention 1" in FIG. 1.

Example 4

A baked product was manufactured as in Example 2 except that step 3) in Example 2 was replaced by the following. The aged solution was cooled to room temperature, and a 15% titanium tetrachloride solution was added so as to achieve a titanium oxide ($TiO_2$) content of 30% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 2" in FIG. 1.

Comparative Example 2

A baked product was manufactured as in Comparative Example 1 except that step 2) in Comparative Example 1 was replaced by the following. The aged solution was cooled to room temperature, and a 15% titanium tetrachloride solution was added so as to achieve a titanium oxide ($TiO_2$) content of 30% by weight of the final product (baked product), and mixed uniformly).

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Conventional Method" in FIG. 1.

Example 5

A baked product was manufactured as in Example 1 except that step 4) in Example 1 was replaced by the following. The aged solution was cooled to room temperature, and a 15% iron chloride (III) solution was added so as to achieve a ferric oxide ($Fe_2O_3$) content of 5% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 1" in FIG. 1.

Example 6

A baked product was manufactured as in Example 2 except that step 3) in Example 2 was replaced by the following. The aged solution was cooled to room temperature, and a 15% iron chloride (III) solution was added so as to achieve a ferric oxide ($Fe_2O_3$) content of 5% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 2" in FIG. 1.

Comparative Example 3

A baked product was manufactured as in Comparative Example 1 except that step 2) in Comparative Example 1 was replaced by the following. The aged solution was cooled to room temperature, and a 15% iron chloride (III) solution was added so as to achieve a ferric oxide ($Fe_2O_3$) content of 5% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Conventional Method" in FIG. 1.

Example 7

A baked product was manufactured as in Example 1 except that step 4) in Example 1 was replaced by the following. The aged solution was cooled to room temperature, and a 15% aluminum chloride solution was added so as to achieve an aluminum oxide ($Al_2O_3$) content of 1% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 1" in FIG. 1.

Example 8

A baked product was manufactured as in Example 2 except that step 3) in Example 2 was replaced by the following. The aged solution was cooled to room temperature, and a 15% aluminum chloride solution was added so as to achieve an aluminum oxide ($Al_2O_3$) content of 1% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 2" in FIG. 1.

Comparative Example 4

A baked product was manufactured as in Comparative Example 1 except that step 2) in Comparative Example 1 was replaced by the following. The aged solution was cooled to room temperature, and a 15% aluminum chloride solution was added so as to achieve an aluminum oxide ($Al_2O_3$) content of 1% by weight of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Conventional Method" in FIG. 1.

Example 9

A baked product was manufactured as in Example 1 except that step 4) in Example 1 was replaced by the following. The aged solution was cooled to room temperature, and a 15% cerium nitrate solution was added so as to achieve a cerium oxide ($CeO_2$) content of 20% of the final product (baked product), together with a 15% lanthanum nitrate solution added so as to achieve a lanthanum oxide ($La_2O_3$) content of 1.7% of the final product (baked product) and a 15% neodymium nitrate solution added so as to achieve a neodymium oxide ($Nd_2O_3$) content of 5.3% of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 1" in FIG. 1.

Example 10

A baked product was manufactured as in Example 2 except that step 3) in Example 2 was replaced by the following. The aged solution was cooled to room temperature, and a 15% cerium nitrate solution was added so as to achieve a cerium oxide ($CeO_2$) content of 20% of the final product (baked product), together with a 15% lanthanum nitrate solution added so as to achieve a lanthanum oxide ($La_2O_3$) content of 1.7% of the final product (baked product) and a 15% neodymium nitrate solution added so as to achieve a neodymium oxide ($Nd_2O_3$) content of 5.3% of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Present Invention 2" in FIG. 1.

Comparative Example 5

A baked product was manufactured as in Comparative Example 1 except that step 2) in Comparative Example 1 was replaced by the following. The aged solution was cooled to room temperature, and a 15% cerium nitrate solution was added so as to achieve a cerium oxide ($CeO_2$) content of 20% of the final product (baked product), together with a 15% lanthanum nitrate solution added so as to achieve a lanthanum oxide ($La_2O_3$) content of 1.7% of the final product (baked product) and a 15% neodymium nitrate solution added so as to achieve a neodymium oxide ($Nd_2O_3$) content of 5.3% of the final product (baked product), and mixed uniformly.

The material properties of the resulting baked product were measured as in Example 1. The composition (% by weight) of the resulting baked product is shown in Table 1, and the material property values in Tables 2 and 3. The pore distribution of a product baked at 1000° C. was measured with roughly the same results as those shown under "Conventional Method" in FIG. 1.

What is claimed is:

1. A zirconia porous body having (1) a peak at pore diameters of 30 to 70 nm in a pore distribution based on the BJH method, (2) a total pore volume of 0.4 cc/g or more, and (3) a specific surface area of at least 30 m²/g after 3 hours of baking at 1000° C., the porous body being substantially composed of zirconium oxide, or a solid solution or mixed oxide comprising zirconium oxide and third component, the amount of the third component being 1 to 49% by weight of the porous body, the third component being at least one of the rare earth elements, transitional metal elements, Ca, Mg, Al, Si and Zn.

2. The zirconia porous body according to claim 1, wherein the volume of pores having a diameter of 10 to 100 nm is 50% or more of the total pore volume.

3. The zirconia porous body according to claim 1, wherein the primary particle size of the particles contained in the porous body is 5 to 30 nm.

4. A method for manufacturing a zirconia porous body according to claim 1, the method comprising:
   (1) a first step of mixing basic zirconium sulfate-containing reaction liquid A, which is prepared by mixing a sulfating agent at a temperature of at least 80° C. but less than 95° C. with a zirconium salt solution at a temperature of at least 80° C. but less than 95° C., with basic zirconium sulfate-containing reaction liquid B, which is prepared by mixing a sulfating agent at a temperature of at least 65° C. but less than 80° C. with a zirconium salt solution at a temperature of at least 65° C. but less than 80° C.,
   (2) a second step of aging the reaction liquid obtained in the first step at a temperature of 95° C. or more,
   (3) a third step of producing zirconium hydroxide by adding alkali to the mixture obtained in the second step to neutralize the basic zirconium sulfate, and
   (4) a fourth step of heat-treating the zirconium hydroxide to obtain a zirconia porous body.

5. The manufacturing method according to claim 4, wherein the free acid concentration of the reaction liquid A is 0.1 to 2.0 N.

6. The manufacturing method according to claim 4, comprising a step of adding a compound of at least one of the rare earth elements, transitional metal elements, Ca, Mg, Al, Si and Zn during at least one of the first through fourth steps.

7. The manufacturing method according to claim 4, comprising a step of adding a salt of at least one of the rare earth elements, transitional metal elements, Ca, Mg, Al, Si and Zn to the basic zirconium sulfate.

8. The manufacturing method according to claim 4, comprising a step of adding an oxide and/or hydroxide of at least one of the rare earth elements, transitional metal elements, Ca, Mg, Al, Si and Zn to the zirconium hydroxide.

* * * * *

UNITED STATES PATENT AND TRADEMARK OFFICE
CERTIFICATE OF CORRECTION

PATENT NO.       : 7,642,210 B2           Page 1 of 1
APPLICATION NO.  : 11/188495
DATED            : January 5, 2010
INVENTOR(S)      : Hiroshi Okamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Sixteenth Day of November, 2010

David J. Kappos
*Director of the United States Patent and Trademark Office*